G. F. ATWOOD.
COMBINED MAGNETIC AND CENTRIFUGAL BRAKE.
APPLICATION FILED NOV. 25, 1907.

1,067,454.

Patented July 15, 1913.

Witnesses:

Inventor
George F. Atwood,
By Barton, Tanner & Folk
Attys.

UNITED STATES PATENT OFFICE.

GEORGE F. ATWOOD, OF NEW YORK, N. Y., ASSIGNOR TO WESTERN ELECTRIC COMPANY, OF CHICAGO, ILLINOIS, A CORPORATION OF ILLINOIS.

COMBINED MAGNETIC AND CENTRIFUGAL BRAKE.

1,067,454.  Specification of Letters Patent.  Patented July 15, 1913.

Application filed November 25, 1907. Serial No. 403,650.

*To all whom it may concern:*

Be it known that I, GEORGE F. ATWOOD, citizen of the United States, residing at New York, in the county of New York and State of New York, have invented a certain new and useful Improvement in Combined Magnetic and Centrifugal Brakes, of which the following is a full, clear, concise, and exact description.

My invention relates to a combined magnetic and centrifugal brake, and its object is to provide a brake which will keep the maximum speed of the motor controlled thereby down to the limiting value at which the stopping device will operate to stop the motor quickly.

My invention is designed more particularly for use with electric motors wherein it is desirable to obtain very quick starts, high acceleration, and sudden stops. When an electric motor of the series type is started, its acceleration increases rapidly unless load is applied. Such type of motor may be used, for example, in driving a brush carrier, with a view of moving the same rapidly over a series of control terminals to a predetermined terminal, the speed in such case being determined in part by duration of travel of the motor. As is evident, the maximum speed allowable is limited by the fact that the excessive momentum developed from too high a speed would prevent prompt stoppage.

My invention consists of an electromagnetic brake the armature of which rotates with the shaft of the motor, and is mounted thereon in a manner to act as a centrifugal brake to control the speed of the motor.

More specifically, my invention, in its preferred form, consists of an electromagnetic brake, the armature of which comprises a segmental weight slidably mounted on a radially projecting arm of a bell-crank lever rotating with the motor shaft, the arrangement being such that, as the shaft carrying the weight rotates, said weight is acted on by centrifugal force, and at a maximum speed is forced outwardly against a stationary rim, thereby applying a braking action to the shaft. When the electromagnet is energized the rocking of the bell-crank lever permits the segmental armature to move into frictional engagement with the stationary member of the electromagnetic brake. Preferably two or more segmental armatures mounted on a corresponding number of bell-crank levers, are employed.

The several features of my invention may be more readily understood by reference to the accompanying drawing, in which—

Figure 2:
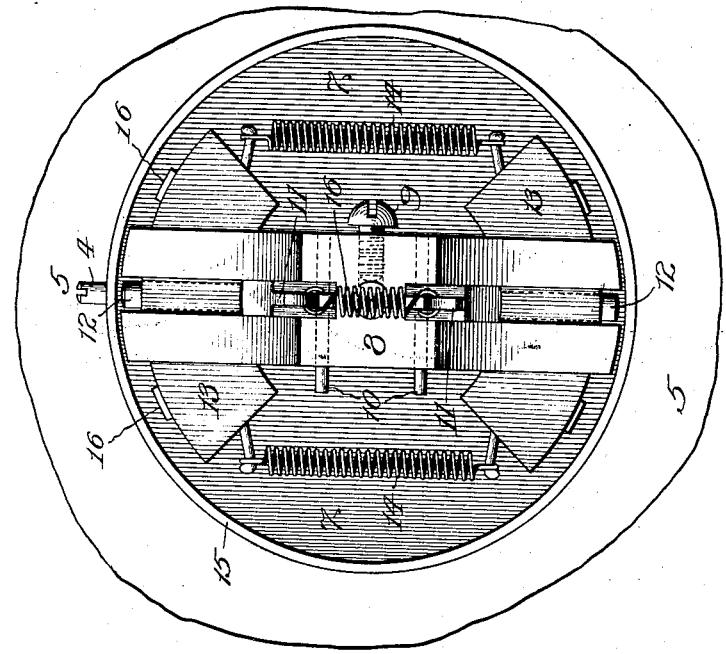
Figure 1:
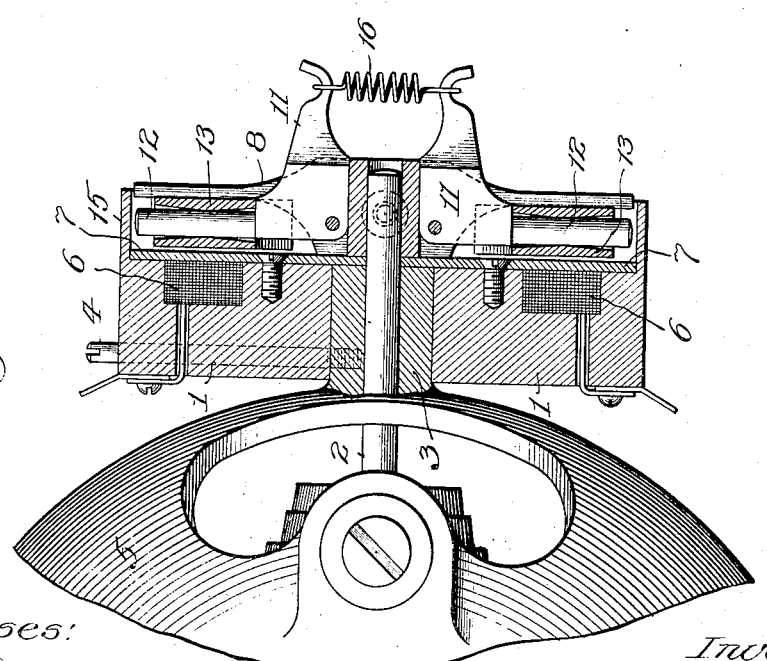

Figure 1 is a cross section of the brake, parts of the motor frame being shown in side elevation; Fig. 2 is a plan view of the brake.

Similar letters of reference are used to designate similar parts wherever shown.

The body of the magnetic brake is preferably in the form of a circular disk 1, fixedly mounted with its axis in alinement with the axis of the motor shaft 2. Said disk is shown in Fig. 1 as mounted on the shaft bearing 3, and secured thereto by a screw 4, said bearing being in the form of a hub extending from the motor frame 5. The disk 1 has the usual annular channel in its face to receive the magnetizing coil 6. Said coil is held in place and protected by a disk 7, preferably of non-magnetic material, such as brass, said disk covering the pole faces and also serving as a friction disk.

It will be seen that the core 1 and magnetizing coil 6 constitute an electromagnet having two pole faces, to wit: the central one surrounding the shaft and located between the energizing coil and said shaft, and the outer pole face comprising that part of the core outside the energizing coil.

A carrier 8 is secured by a screw 9, or in any other suitable manner, to the shaft 2. Said carrier extends diametrically across the face of the disk 1, and comprises a thick hub portion and oppositely extending slotted arms. Pivotally mounted in the slots in said arms, on pins 10, 10, are bell-crank levers 11, 11. The radially extending portions of said levers are in the form of cylindrical pins 12, which carry segmental shaped iron weights or armatures 13. Said weights are slidably mounted on the pins 12, but are normally held in toward the axis of the shaft by retractile springs 14, 14, which connect the ends of one segment with the adjacent ends of the other segment. The disk 1 has an annular flange or rim 15 with which the segments are adapted to engage when the centrifugal force due to rotation is sufficient to overcome the tension of the springs 14, 14. Said segments are provided on the periphery facing the flange 15 with shoes 16 of fiber, leather or other non-abrasive material, thereby increasing the friction and also preventing abrasion of the metals. The ends of the axially extending arms of the bell-crank levers are connected by a retractile spring 16, which prevents the segmental weights 13 from engaging with the friction disk 7 when the electromagnetic brake is not energized. The retractile springs 14 are adjusted so as to prevent the segmental weights flying out by the action of centrifugal force against the rim 15 until the predetermined speed of rotation is attained. Therefore the motor may be quickly started, and when the limiting speed is attained the segmental weights 13 fly out and act as centrifugal brakes. Upon the coil 6 being energized, the segments 13 are attracted toward the face of the electromagnet, against the force of the retractile spring 16, and by frictional engagement with the disk 7 act as magnetic brakes.

I claim:

1. The combination with a rotary shaft and a bearing therefor, of an electromagnet having a disk-shaped body portion mounted on said bearing, and an armature pivotally mounted on said shaft in proximity to the pole faces of said electromagnet.

2. In apparatus of the class described, the combination with a motor shaft, of an electromagnet, a radially extending lever pivotally mounted on said shaft to rotate therewith, an armature slidably mounted on said lever, and a coöperating friction member with which said armature is adapted to engage under the action of centrifugal force.

3. In a combined magnetic and centrifugal brake, the combination with a rotary shaft, of an electromagnet having a disk-shaped body portion, a radially extending lever pivotally mounted on said shaft to rotate therewith, an armature slidably mounted on said lever, and adapted to be rocked into frictional engagement with said electromagnetic body, and an annular flange extending from said disk body portion and arranged to frictionally engage with said armature when the same is thrown outwardly by centrifugal force.

4. In apparatus of the class described in combination a stationary electromagnet having a polar portion thereon, a rotating shaft, and an armature carried by said shaft adapted to be moved radially of said shaft by centrifugal force and longitudinally thereof by magnetic action into frictional engagement with said polar portion.

5. The combination with a rotary shaft, of a combined magnetic and centrifugal brake comprising an electromagnet, a carrier secured on said shaft, said carrier carrying a radially extending member, and an armature slidably mounted on the radial member arranged to be acted upon by centrifugal force and by magnetic attraction to frictionally engage with a portion of said electromagnet.

6. The combination with a rotary shaft, of a combined magnetic and centrifugal brake, comprising an electromagnet having a disk-shaped body provided with an annular flange, a carrier secured to said shaft, said carrier carrying a radially extending member, a segmental armature slidably mounted on the radial member and adapted to be acted upon by centrifugal force to frictionally engage said flange and to be acted upon by magnetic attraction to engage the pole faces of said electromagnet.

7. The combination with a rotary shaft, of a combined magnetic and centrifugal brake, comprising an electromagnet having a disk-shaped body provided with an annular flange, a carrier secured to said shaft, a bell-crank lever mounted on said carrier with its arms extending radially and longitudinally, respectively, of said shaft, a segmental armature slidably mounted on the radial arm of said lever within said annular flange, retractile means opposing the action of centrifugal force on said armature, and a spring normally acting on the longitudinal arm of the lever to withdraw the armature from contact with the pole faces of said electromagnet.

8. In apparatus of the class described, the combination with a rotary shaft, of a disk-shaped electromagnet having its axis in alinement with said shaft, a carrier secured on said shaft, said carrier extending diametrically of the face of the disk and having its ends slotted, bell-crank levers pivoted to said carrier within said slots, the arms of each lever extending radially and longitudinally, respectively, of said shaft, an annular flange extending from the periphery of said electromagnet and surrounding the ends of the radial arms of said levers, segments of magnetic material slidably mounted on said radial arms, retractile springs connecting the ends of one segment with the adjacent ends of the other segment, and a retractile spring connecting the longitudinally extending ends of said bell-crank levers.

In witness whereof, I hereunto subscribe my name this 16 day of November A. D., 1907.

GEORGE F. ATWOOD.

Witnesses:
　HENRY W. WILDER,
　C. E. BROKAW.